Sept. 6, 1927.  J. B. KIRBY  1,641,334
REBOUND RETARDER
Filed Feb. 25, 1924  2 Sheets-Sheet 1
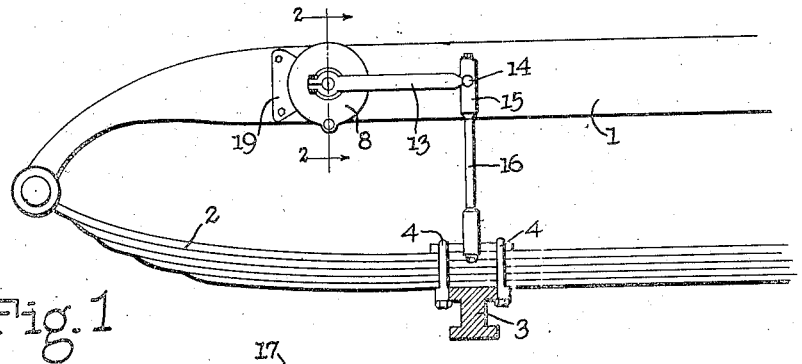
Fig.1
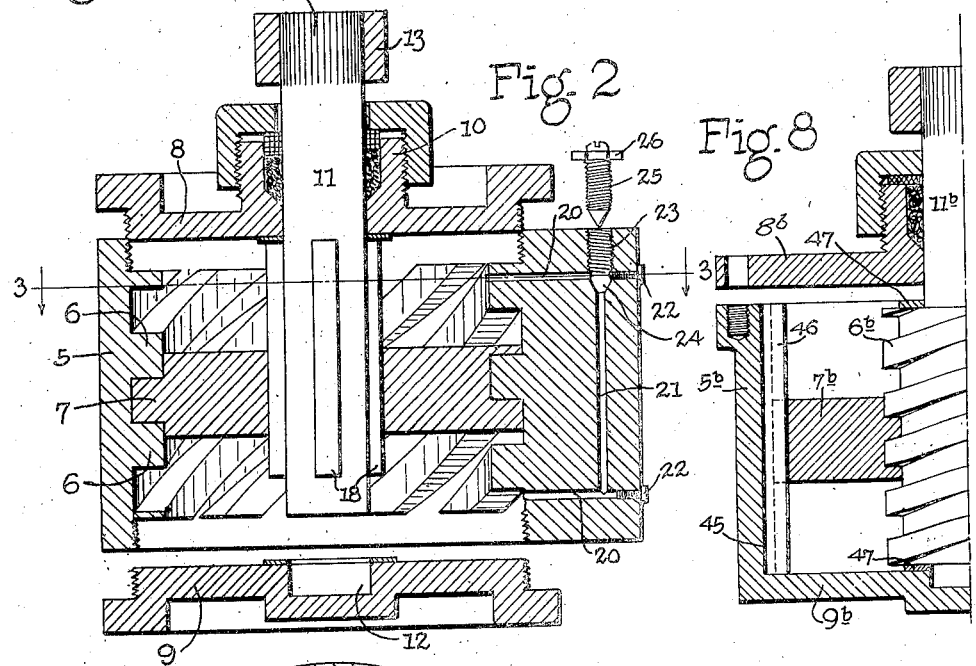
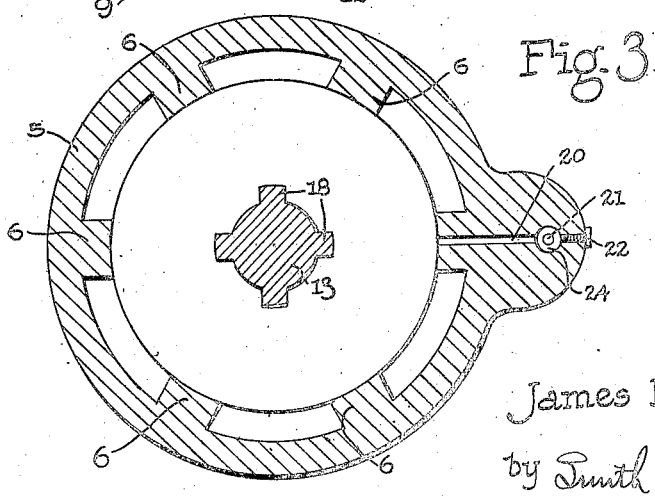
James B. Kirby
Inventor
by Smith & Freeman
Attorneys Sept. 6, 1927. 1,641,334
J. B. KIRBY
REBOUND RETARDER
Filed Feb. 25, 1924   2 Sheets-Sheet 2
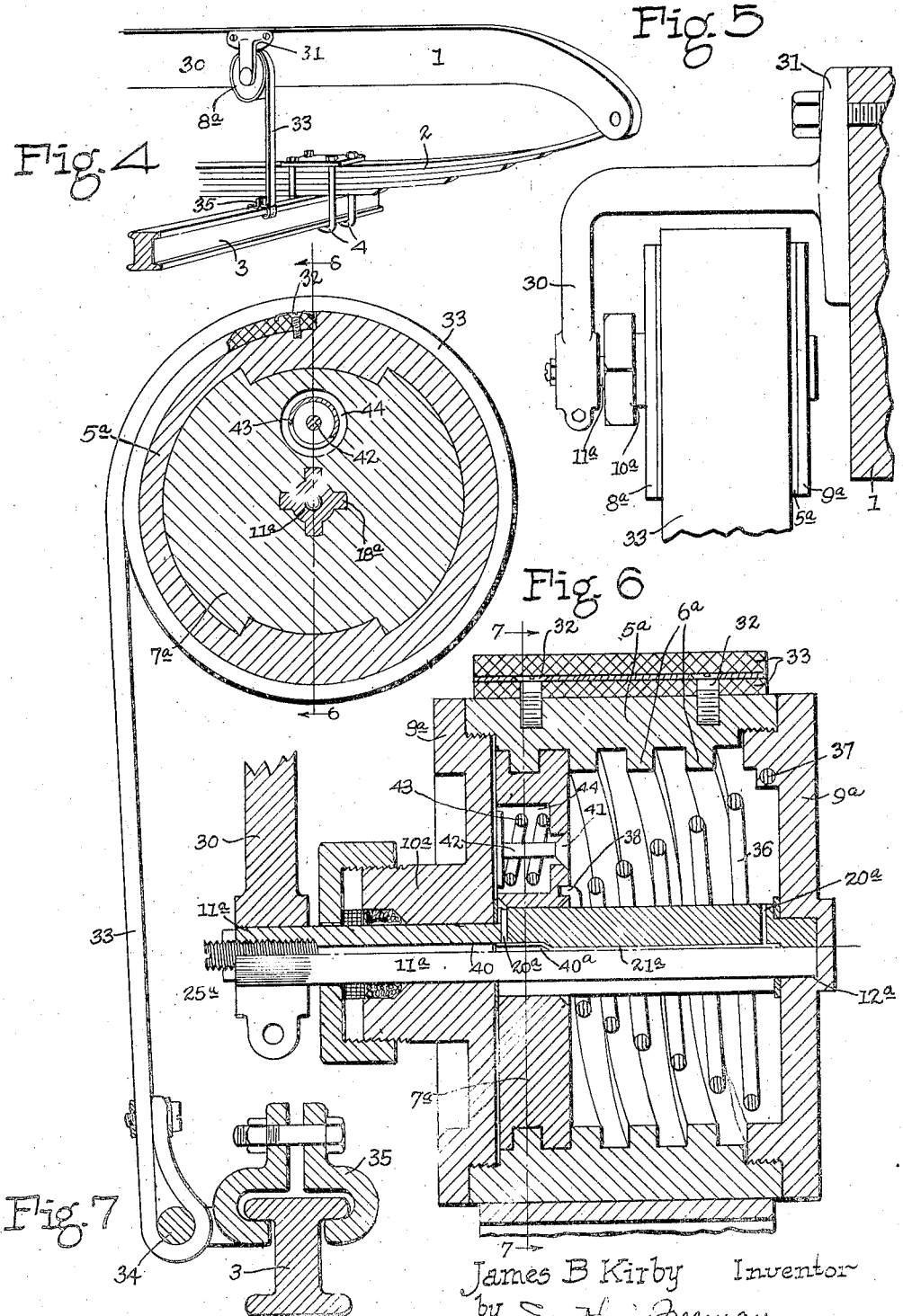
James B Kirby Inventor
by Smith & Freeman
Attorneys Patented Sept. 6, 1927.

1,641,334

UNITED STATES PATENT OFFICE.

JAMES B. KIRBY, OF WEST RICHFIELD, OHIO.

REBOUND RETARDER.

Application filed February 25, 1924. Serial No. 694,898.

This invention relates to that class of devices, popularly known as shock absorbers employed for restraining the excessively violent movement of automobile springs thereby rendering the movements of the vehicle body more comfortable and decreasing the danger of breaking the springs. The objects of the invention are the provision of a new, compact, simple, and easily manufactured device of this character, which shall consist of the smallest possible number of parts, be readily applied to the vehicle, adjust itself automatically to varying loads, and exert a restraining action at all times proportionately to the force impressed thereon; while further objects and advantages of the invention will become apparent as the description proceeds.

In the drawings accompanying and forming a part of this application I have shown certain physical structures in which my inventive ideas may be employed although it will be understood that these drawings are intended merely to be illustrative of the principles of my invention and not exhaustive of the structures by which the same can be utilized. Fig. 1 illustrates a part of an automobile frame and spring equipped with one form of my invention; Fig. 2 is a sectional view corresponding to the line 2—2 of Fig. 1 but showing the casing-heads detached; Fig. 3 is a sectional view corresponding to the line 3—3 of Fig. 2; Fig. 4 is a perspective view of part of an automobile equipped with a modified form of my invention; Fig. 5 is a front elevation of the device shown in Fig. 3; Fig. 6 is a sectional view corresponding to the line 6—6 of Fig. 7; Fig. 7 is a sectional view corresponding to the line 7—7 of Fig. 6; and Fig. 8 is a sectional view of another modification.

Describing the parts by reference characters, 1 represents a part of the frame of an automobile, 2 one of the springs, and 3 one of the axles to which the spring is fastened by suitable U-bolts 4—4. First describing particularly the form of my invention shown in Figs. 1, 2, and 3, 5 represents a cylindrical metallic casing having at one side a bracket 19 by which it can be attached to the frame, its interior portion being formed throughout the greater part of its length with coarse threads 6—6 of steep pitch with which cooperates a longitudinally movable plunger 7 threaded to engage the same. The ends of the casing are closed by suitable heads 8 and 9, threaded or otherwise suitably secured thereto. One of these heads, as 8, is formed with a suitable stuffing box 10 traversed by the rock shaft 11, one end of which is received in the socket 12 of the head 9. Rigidly secured to the outer end of this shaft is the lever 13 formed at its end with a ball 14 received in the socket 15 carried by the vertical rod 16, the opposite end of which is suitably articulated to the axle 3. Any suitable or convenient expedient may be employed for preventing the arm from turning on the shaft, for example the end of the shaft may be fluted as shown at 17 and the arm driven or clamped thereon.

Between the heads 8 and 9 the exterior of this shaft is formed with longitudinal ribs 18, the plunger 7 being formed with a central aperture conforming closely to this shaft and its ribs. The pitch of the thread is so adjusted relatively to the length of the casing and thickness of the plunger as to cause the latter to traverse substantially the full length thereof in a 90° movement of the arm 13.

The end portions of the chambers are connected together by a system of passageways which may conveniently take the form of a pair of radial bores 20—20 intersecting a longitudinal bore 21. The outer ends of the bores 20—20 are then closed permanently by plugs 22—22 while the outer end of the bore 21 is provided with a threaded socket 23 terminating in a seat 24 and receiving the adjustable screw 25 constituting an adjusting valve. A lock nut 26 can be employed for preventing accidental movement.

In use the casing is filled with glycerine, lubricating oil, or other non-freezing liquid. Owing to the fact that the casing shaft, plunger, etc. can be made by broaching and other quantity production processes it is possible to manufacture a device of this sort at a minimum of expense, while the parts being few in number and rugged in construction are readily made and assembled and not readily broken.

In the device shown in Figs. 4 to 7 inclusive 5ᵃ represents a cylindrical casing formed interiorly with a plunger 7ᵃ and its ends with heads 8ᵃ and 9ᵃ as before. The head 8ᵃ is formed with a stuffing box 10ᵃ through which passes the shaft 11ᵃ whose opposite end is set in the socket 12ᵃ of the opposite head. In this embodiment, however, the projecting end of the shaft is mounted in the arm 30 of the bracket 31 carried by the frame 1, leaving the casing rotatable upon said shaft. Inside the casing this shaft as before is formed with the longitudinal ribs $18^a$ closely embraced by the plunger $7^a$. Secured to the exterior of the casing by any suitable means such as screws 32—32 is the flexible strap 33 which after wrapping itself a sufficient distance around the casing is attached to the axle 3 in any suitable manner, for example by means of the bracket 34 attached thereto by the clamp 35. By the operation of the strap the casing will be turned in one direction, moving the plunger along the casing in an obvious manner. To restore the casing to its former position I have shown a volute spring 36 having one end fastened relatively to the casing (as by attachment to a lug formed in the adjacent head as shown at 37) and the other end fastened to the plunger as at 38. This spring can operate both by its longitudinal expansion and by its torsion. When it is attached to the head $9^a$ as shown herein, the latter is preferably secured to the casing by screw threads as herein illustrated, the direction of twist of the spring 36 is so chosen that the same will be wound up as the head is screwed into place. Of course I do not limit myself to these features. This spring is also arranged to oppose the pull of the strap 33. The pitch of the threads $6^a$ is preferably much less abrupt than in the case first described, since a larger angular movement may be employed. In this embodiment I have shown a device requiring 1½ revolutions of the casing to move the plunger from one end to the other. To oppose this movement the casing is filled with suitable liquid as before, and a controllable duct provided at some convenient place for regulating the flow of this liquid from one side to the other when tension is exerted upon the strap 33. In order to preserve the substantial uniformity of the shape of the casing I have shown the duct $21^a$ as formed longitudinally of the shaft $11^a$ and opening laterally through ducts $20^a$ at each end of the chamber. The outer end of the bore $21^a$ is enlarged for the reception of the adjusting screw $25^a$ which is here shown as provided with a long shank 40 terminating in a tapered extension $40^a$. In order to permit return of the casing under the comparatively small force of the spring 36 I preferably form the plunger with a suitable relief valve adapted to open easily by pressure in the appropriate direction. This valve may comprise a headed member 41 seated at one side of the plunger and having it shank 42 embraced by a weak spring 43 received in a recess 44 on the opposite face of the plunger.

In the device shown in Fig. 8 the casing $5^b$ is formed with a smooth cylindrical wall, unbroken except for one or more longitudinal keyways 45, and the shaft $11^b$ is made with an enlargement inside the casing upon which the multiple pitch thread $6^b$ is formed. The plunger $7^b$ is threaded to match the shaft and slotted to match the casing, a key or spline 46 being used to prevent rotation of the plunger. In this case I have shown the casing with one head $9^b$ integral and the other, $8^b$ bolted. The increased thrust caused by threading the shaft is carried by suitable bearings 47. This device can be affixed to the vehicle parts in either of the modes heretofore described and the liquid transfer accomplished either as heretofore suggested or by having the plunger so loosely adjusted that natural leakage will suffice.

Any of these devices will adopt a position in its casing depending upon the normal deflection of the vehicle springs. When a valve is used it is so adjusted that the liquid will pass from one side of the plunger to the other with sufficient readiness to avoid transmitting to the frame the minor vibrations of the axle while preventing any severe throw of the body consequent on a major deflection of the spring. It will be understood, however, that other kinds of valves can be used or that a passageway of fixed size is possible, the valve being omitted. This is the condition existing in the device shown whenever the valve is wholly open. Likewise it is feasible to make and use the device without any passageway, the plunger being made so loose that the leakage therepast affords the approximate retardation required. This is the condition actually existing in the devices shown in Figs. 1 to 7 inclusive whenever the valve is wholly closed.

I do not limit myself to the use of integral ribs on the shaft, since they can be made separate like the key 46, nor of ribs which are strictly longitudinal as distinguished from somewhat angular, nor having both heads removable since it will be understood that these and many other changes in point of detail can be made within the scope of my invention and within the prior art and annexed claims.

Having thus described my invention what I claim is:

1. In a device of the character described, a hollow internally threaded, liquid containing casing having liquid-tight heads, a shaft journaled axially within said casing, a plunger threaded in said casing and apertured for said shaft, the shaft and plunger having interfitting provisions whereby relative sliding is permitted and screwing of the plunger along the casing is compelled, means for attaching said casing and shaft, the one to the body and the other to an axle of a vehicle, said means including a strap whereby relative movement between said casing and shaft is caused in one direction, means including a spring for causing relative movement of said casing and shaft in the opposite direction, and a one way valve adapted automatically to establish free communication between the ends of said casing while said plunger is being moved by said spring and to restrict said communication at other times.

2. In a device of the character described, an internally threaded, liquid containing casing having liquid-tight heads, a shaft journaled axially within said casing, a plunger threaded in said casing and apertured for said shaft, the shaft and plunger having interfitting provisions whereby relative sliding is permitted and screwing of the plunger along the casing is compelled, a flexible tension member adapted to be wound around said casing, means for attaching said shaft and member to two independently movable parts, a spring operatively connected between said shaft and casing and arranged to oppose relative movement of the parts by said tension member, and means for permitting the movement of liquid from one end of said casing to the other at different rates depending upon the direction of its flow.

3. In a device of the character described, a hollow, cylindrical, liquid-containing casing having heads and internal threads, a shaft journaled in one of said heads axially of said casing, a plunger in said casing connected to said shaft so as to slide therealong but not to turn relatively thereto, said plunger having threads engaging said first threads, means for securing said shaft and casing, the one to the body and the other to the axle of a vehicle, one of said means comprising a flexible strap, and a spring in said casing operatively engaging said plunger to keep said strap taut.

4. In a device of the character described, a hollow, cylindrical, liquid-containing casing having heads and internal threads, a shaft journaled in one of said heads axially of said casing, a plunger in said casing connected to said shaft so as to slide therealong but not to turn relatively thereto, said plunger having threads engaging said first threads, means for securing said shaft and casing, the one to the body and the other to the axle of a vehicle, one of said means comprising a flexible strap, a spring in said casing operatively engaging said plunger to keep said strap taut, there being a passageway between the ends of said casing, and a check valve in said passageway adapted to open in a direction to permit movement of said plunger by said spring.

In testimony whereof, I hereunto affix my signature.

JAMES B. KIRBY.